UNITED STATES PATENT OFFICE.

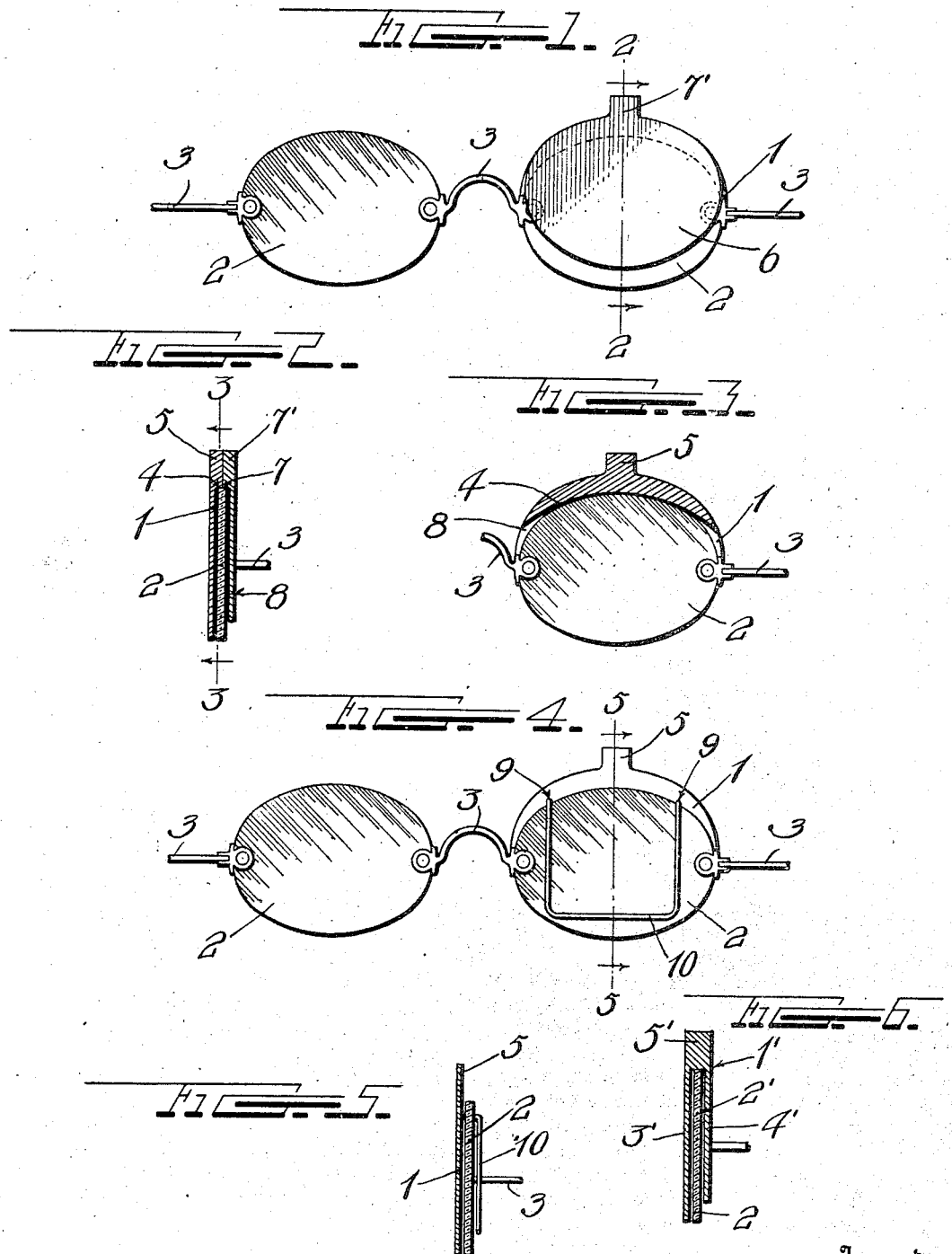

MARTIN J. ROONEY, OF BUTTE, MONTANA.

EXERCISING LENS-SHADE.

1,130,634.  Specification of Letters Patent.  Patented Mar. 2, 1915.

Application filed October 22, 1914. Serial No. 868,066.

*To all whom it may concern:*

Be it known that I, MARTIN J. ROONEY, a citizen of the United States, residing at Butte, in the county of Silverbow and State of Montana, have invented certain new and useful Improvements in Exercising Lens-Shades; and I do declare the following to be a full, clear, and exact description of the invention, such as will enable others skilled in the art to which it appertains to make and use the same.

This invention generically pertains to attachments for spectacles or eye glasses, but more particularly to that class of the latter which serve as shielding mediums for the same.

One object of my invention resides in providing a simple and efficient shield that may be readily and quickly attached to a spectacle lens or to the rim of a spectacle frame so as to effectually obstruct the vision through the lens, before which it is disposed.

A further object resides in providing a unique and simple means for maintaining the shield in a fixed position upon the lens and in a plane parallel thereto.

A still further object is to provide a convenient gripping member by means of which the shield can be easily disengaged and removed from its position upon the lens.

Another object of my invention is to provide a shield that is inexpensive to produce and which may be conveniently carried upon the person for immediate use whenever desired.

With these and other objects in view, my invention consists of certain novel details of construction, arrangement and combination of parts to be more particularly set forth and claimed.

In the accompanying drawings in which corresponding parts are indicated by similar reference characters Figure 1 is a rear elevation of my improved shield illustrating the latter as applied to a standard sized spectacle lens; Fig. 2 is a transverse vertical section thereof taken on the line 2—2 of Fig. 1; Fig. 3 is a transverse longitudinal section thereof taken on the line 3—3 of Fig. 2; Fig. 4 is a rear elevation of the modified form of my improved shield, and illustrating the latter as applied to a standard spectacle lens; Fig. 5 is a transverse vertical section thereof taken on the line 5—5 of Fig. 4, and Fig. 6 is a transverse vertical section of a modified form for my improved eye shield and illustrating the latter as applied to a standard spectacle lens.

It is a fact well known by opticians that with many people the retina of one eye is more sensitive and active than that of the other, the result being that the vision of one eye is superior to that of the other, which causes a strain on the eye having the weaker retina that will in time lead to a serious impairment of this weaker optic. To overcome this deficiency, attempts have been made by bandaging the stronger eye to exercise and place the strain upon the weaker one, but the bandages have proved to be a constant source of annoyance, and in every way, are unsatisfactory. It is to this end that I provide a shield 1 having an elliptical configuration so as to approximately conform to the shape of the standard lens 2 carried by the frame 3. This shield may be composed of bone, rubber, cardboard, or any suitable light-obstructing material, but it is preferably formed of rubber or celluloid so that it will be extremely light and not annoying when disposed upon the lens of the spectacle. The shield 1 is formed with an inwardly projecting flange 4 disposed contiguous to its upper end and extending from one extremity of its longitudinal axis to the other extremity thereof, for a purpose hereafter to be described. Also disposed upon the upper edge of the shield 1 at a point approximately central of its longitudinal axis is an integrally formed gripping member 5.

To enable the shield 1 to be properly disposed in front of a lens, I provide a holder 6 which is formed of the same material as the shield and has substantially the same conformation, but is a trifle smaller so that when in place contiguous to the shield 1 its lower edge will be offset from that of the latter. The holder 6 also has an inwardly projecting flange 7 disposed contiguous to its upper edge and extending from one extremity of its longitudinal axis to the other. From this construction, it will become apparent that when the edge of the flange 7 on the holder 6 is placed against the edge of the flange 4 on the shield 1, said holder will be disposed in offset relation with respect to the shield so as to form a pocket 8 which receives the lens, as clearly shown in Fig. 2. In this connection it is to be noted that the lower edge of the holder is disposed contiguous to that of the shield which arrangement produces an extremely deep seat which substantially conforms to the width of the lens and consequently greatly facilitates the engagement and disengagement of the shield with said lens, and also provides against the accidental displacement of the shield as will be readily understood without further description. Of course, it is to be understood that the shield and holder are retained in position by means of a suitable binder disposed between the two such as glue or the like. Furthermore, the holder 6 has an extension 7' integrally formed therewith upon its upper edge approximately central of its longitudinal axis which when the holder and shield are placed together coincides with the gripping member 5 on the shield and the two form a handle by means of which the shield may be engaged and disengaged from the lens as will be readily understood without further description. Thus it will be seen that when it is desired to obstruct the vision through one lens, the shield 1 is placed above the upper edge of the lens and is then brought downwardly so that said lens will project in the pocket 8 and be entirely enveloped by the members forming said shield, as clearly shown in Fig. 2.

As a modification of my original idea, shield 1 in place of the holder 6 may be provided with two openings 9 which receive the ends of the wire holder 10 disposed in offset relation to the rear of the shield 1, so as to form a seat for the lens, as clearly shown in Fig. 4.

Thus it will be seen that I have by the foregoing structure provided a shield which if properly utilized in the manner specified before the stronger optic will greatly augment the activity and sensitiveness of the weaker one and consequently make it possible to secure such lenses as will provide equal vision for the eyes which before the use of this shield was impossible without unduly straining the weaker optic, as will be readily understood.

Although in the foregoing description, I have described certain elements as best adapted to perform the function ascribed to them, nevertheless, it is to be understood that various minor changes as to form, substance, etc., may be resorted to within the scope of the appended claims without departing from or sacrificing any of the principles of this invention.

If found desirable I may, instead of forming the shield and holder in two pieces as hereinbefore described, construct the same integrally, that is a blank 1' a suitable thickness and having a configuration corresponding to a standard lens, is channeled longitudinally as at 2' to form a seat for the lens 3 as clearly shown in Fig. 6, the channel 2' forming a shield 3' and holder 4' which latter has its lower edge cut away and spaced from the lower edge of the shield 3'. The hand gripping member 5' disposed upon the upper edge of the blank 1' provides the necessary handle so that this form of shield and holder will correspond in configuration and design to the shield constructed in two parts as above described.

Having now described my invention, what I claim is:

1. A lens shield comprising a shielding member having a configuration conforming substantially to that of a standard lens, an inwardly projecting flange formed around the upper edge of said member, a holder, an inwardly projecting flange on the latter whose edge is adapted to abut that of the first mentioned flange whereby to dispose said holder in offset relation with respect to said shielding member and form a pocket to receive an eye glass lens, and a pair of coacting extensions formed on the upper edge of said shield and holder respectively whereby to form a handle for the same.

2. A lens shield comprising a shielding member corresponding approximately in shape and size to a standard spectacle lens, an inwardly projecting flange formed on the upper edge of said member and extending from one extremity of its longitudinal axis to the other, an integrally formed upwardly projecting extension disposed upon the upper edge of said shielding member, a holder having configuration corresponding to that of said shielding member, a flange formed around the upper edge of said holder, the outer edges of said flanges being adapted to abut, whereby to dispose said holder in offset relation with respect to said shield, means for uniting the abutting edges of said flanges, and an extension formed on the upper edge of said holder and adapted to coincide with the extension on said shielding member whereby to coact with said extension, whereby to form a handle.

3. A lens shield of the character described comprising a translucent shielding member having a configuration corresponding to that of a standard eye-glass lens, an integrally formed hand grip rising vertically from the upper edge of said member at a point thereon coincident with the vertical axis of the latter, a holder having its upper extremity secured to the central portion of the upper edge of said member and depending therefrom in offset relation to said member for coöperation with the latter to produce a seat for the reception of said lens, said holder having its lower edge adjacent that of said member whereby said seat will have a depth corresponding substantially to the width of said lens substantially as and for the purpose set forth.

In testimony whereof I have hereunto set my hand in presence of two subscribing witnesses.

MARTIN J. ROONEY.

Witnesses:
JOSEPH JONES,
B. RICHARDS.